United States Patent [19]
Grilliot et al.

[11] Patent Number: 4,897,886
[45] Date of Patent: Feb. 6, 1990

[54] FIREFIGHTER'S GARMENTS HAVING MINIMUM WEIGHT AND EXCELLENT PROTECTIVE QUALITIES

[76] Inventors: William L. Grilliot; Mary I. Grilliot, both of 1986 Home Ave., Dayton, Ohio 45417

[21] Appl. No.: 278,553
[22] Filed: Nov. 30, 1988
[51] Int. Cl.[4] .......................... A41D 1/02; A41D 13/00
[52] U.S. Cl. .............................................. 2/81; 2/82; 2/93; 2/272
[58] Field of Search ...................... 2/81, 87, 97, 69, 82, 2/93, 272, 243 R

[56] References Cited

U.S. PATENT DOCUMENTS

| | | | |
|---|---|---|---|
| 3,710,395 | 1/1973 | Spano et al. | 2/81 X |
| 4,604,759 | 8/1986 | Bowman et al. | 2/81 |
| 4,709,421 | 12/1987 | Grilliot et al. | 2/81 |
| 4,748,691 | 6/1988 | Grilliot et al. | 2/81 |

*Primary Examiner*—H. Hampton Hunter
*Attorney, Agent, or Firm*—Jacox & Meckstroth

[57] ABSTRACT

A firefighter's garment as disclosed herein may be a coat or trousers or a vest. The garment has an outer layer, an intermediate layer, and an inner layer. A spacer element or elements are positioned between two of the layers of the garment. The spacer element or elements in the firefighter's garment establish and maintain an air space or air spaces between the layers of the garment, even when localized pressure or weight is applied to portions of the garment. Thus, the firefighter's garment has excellent heat insulation qualities without being heavy and/or bulky. Thus, a firefighter wearing the garment is continually protected and is subject to minimum stress and is able to work more effectively than a firefighter wearing a firefighter's conventional garment.

22 Claims, 2 Drawing Sheets

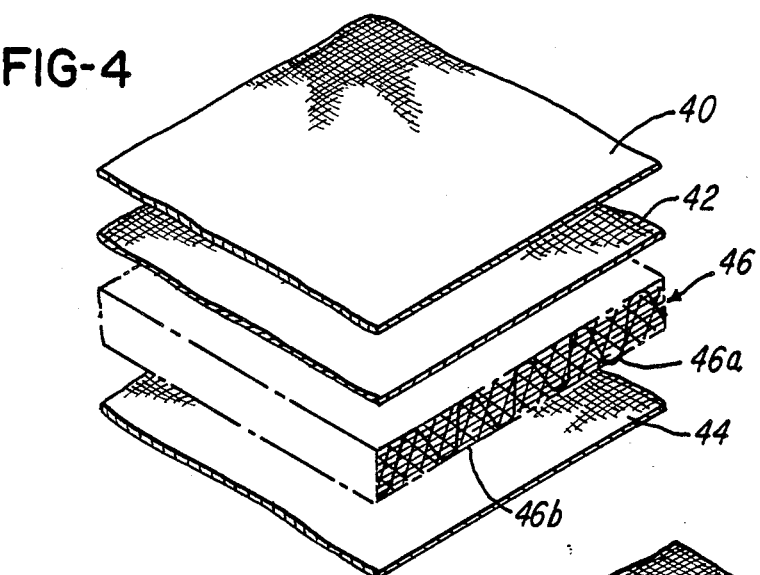
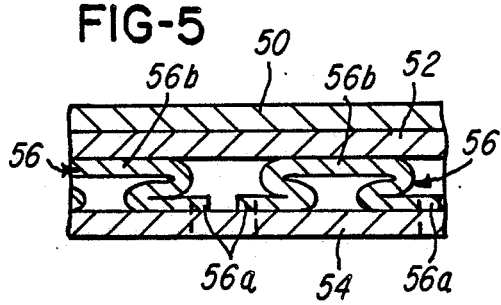
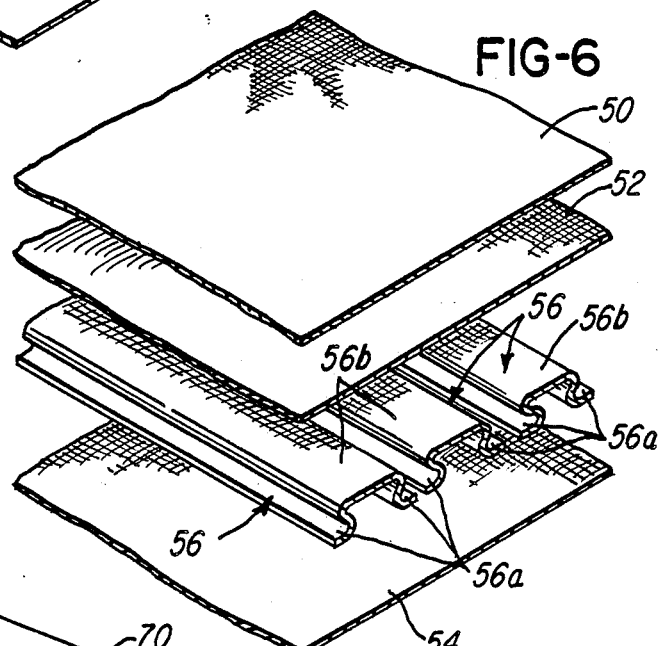
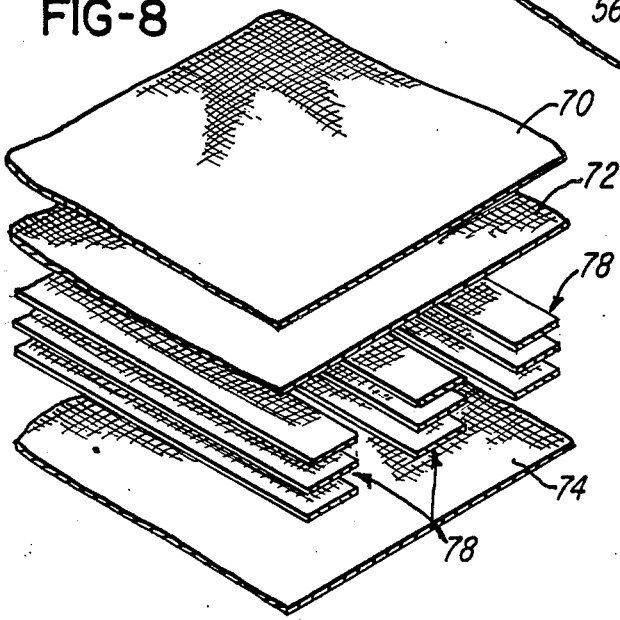
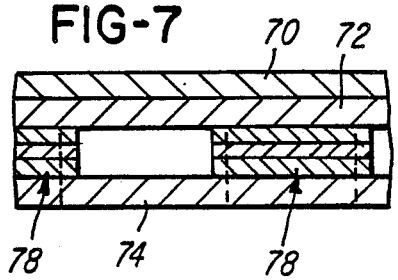

FIREFIGHTER'S GARMENTS HAVING MINIMUM WEIGHT AND EXCELLENT PROTECTIVE QUALITIES

BACKGROUND OF THE INVENTION

During the fighting of a fire, a firefighter works in a very hostile environment. Many firefighters lose their lives while fighting fires. Most of the deaths of firefighters while fighting fires are the result of stress, heart attacks, strokes, and the like. Of course, a firefighter must be protected from the environment within which the firefighter works. However, in an attempt to provide adequate protection, the garments of firefighters have been too heavy and too bulky.

Firefighter's coats and trousers customarily have three layers of material: an outer shell or layer, which is flame resistant and abrasion resistant, and an intermediate layer which is a moisture barrier, and an inner layer, which is a thermal barrier. These layers may be three separate distinct layers or may be one or two members.

Customarily, the inner layer, or thermal barrier, in a firefighter's garment is significantly thick and bulky. Optimal thermal insulation in a garment is dead air space within the garment. Dead air space can be provided in a garment at relatively low costs. Dead air space creates minimal weight in a garment. However, even though dead air as a thermal insulator in a garment has been recognized in the clothing industry, this fact has not received significant recognition in the design and construction of firefighters' protective clothing.

This absence of use of dead air insulation in firefighters' clothing has resulted from the fact that in a garment which is designed for dead air as thermal insulation, that dead air insulation must be guaranteed and maintained during all firefighting activity of a firefighter who wears the garment. Localized pressure upon a firefighter's garment may occur as a firefighter carries firefighting apparatus, or an object or a person. Localized pressure may also occur in a firefighter's garment as the firefighter moves and works. During firefighting activity a firefighter frequently finds it necessary to carry relatively heavy and/or bulky items, such as a breathing apparatus tank, water hose, and the like. If conventional dead air space means in clothing should be provided in a firefighter's garment, sch heavy items carried by the firefighter would apply pressure upon portions of the firefighter's clothing and would reduce or destroy the dead air space in the firefighter's garment. Thus, conventional dead air space structure for thermal insulation cannot be employed in a firefighter's garment, because such conventional structure cannot assure or maintain dead air space in a firefighter's garment.

It is an object of this invention to provide firefighters' garments which have the same quality of protection or better protection against the environment than conventional firefighters' garments but which have significantly less weight, permitting greater ease of movement of the firefighters and less stress upon the firefighters than conventional garments of firefighters.

It is another object of this invention to provide firefighters' garments in which dead air space is employed as thermal insulation and in which the dead air space is maintained even when significant external pressure or weight is applied to the garments.

Another object of this invention is to provide firefighters' garments which contain ventilation means.

Another object of this invention is to provide a means and a method which can be used in constructing firefighters' coats, vests, and trousers, and other garments or wearing apparel in which air space is employed as insulation.

Another object of this invention is to provide such firefighters' garments which can be constructed at lower costs than firefighters' conventional garments.

Other objects and advantages of the firefighters' garments of this invention reside in the construction of parts, the combination thereof, the method of production and the mode of use, as will become more apparent from the following description.

SUMMARY OF THE INVENTION

In this invention the inner layer of a firefighter's garment is reduced to a very thin dimension and air spacer means which create and maintain a dead air space is positioned between the intermediate layer and the inner layer. The air space provides excellent thermal protection while permitting the garment to have minimum weight. The air spacer means is capable of maintaining an air space or air spaces in the garment even under conditions of localized pressure or weight upon the garment.

In this invention any suitable material which provides and maintains an air space or air spaces between the inner layer and the intermediate layer can be used. Preferably, the spacer material between the intermediate layer and the inner layer is a heat resistant corrugated mesh material which creates and maintains a multiplicity of small air spaces, while also providing resistance against compressional forces. However, other spacer means or spacer materials and/or elements can be used to create and maintain an air space or air spaces between the intermediate layer and the inner layer.

A firefighter's garment made according to this invention may have the air spacer means between the inner layer and the intermediate layer throughout the entire garment. However, a firefighter's garment made according to this invention may have the thermal or inner layer of conventional material throughout some portions of the garment and the air spacer means of this invention within the other portions of the garment. Preferably, the corrugations or spacer elements of the air spacer means are arranged to create ventilation through the garment.

The air spacer means of this invention serve several functions: The air spacer means provide a firefighter's garment with excellent thermal protection with minimum weight. The air spacer means maintain the same insulation qualities in the garment, even though localized pressure or loads may be applied to exterior portions of the garment as the firefighter works. The air spacer means of this invention also maintain the same insulation qualities in the firefighter's garment as localized pressure occurs as the firefighter moves arms, legs, shoulders and other parts of the body. Preferably, the air spacer means also provide for ventilation of the garment as the air spacer means create upwardly extending channels in the garment through which the body heat of the firefighter escapes to the exterior of the garment.

Thus, stress upon a firefighter is greatly reduced as the firefighter wears garments of this invention which have minimum weight, with enhanced insulation qualities and with ventilation qualities.

A firefighter's garment made according to this invention meets and complies with all of the standard requirements for thermal insulation and flame resistance, even though a garment of this invention is much lighter in weight and involves less stress in the firefighter than conventional firefighter garments.

A garment constructed in accordance with this invention may comprise a coat or a vest or trousers, or any other article of wearing apparel.

BRIEF DESCRIPTION OF THE VIEWS OF THE DRAWINGS

FIG. 4 is an exploded fragmentary perspective view, drawn on a smaller scale than FIG. 2, illustrating a modification in the spacer means which is positioned between the inner layer and the intermediate layer of a firefighter's garment in accordance with this invention.

FIG. 5 is a fragmentary sectional view, drawn on substantially the same scale as FIG. 2, illustrating another modification in the spacer means positioned between the inner layer and the intermediate layer in a firefighter's garment constructed in accordance with this invention. FIG. 5 may be considered as being taken substantially on line 2—2 of FIG. 1.

FIG. 6 is an exploded fragmentary perspective view, drawn on substantially the same scale as FIG. 4, further illustrating the spacer structure shown in FIG. 5.

FIG. 7 is a fragmentary sectional view, drawn on substantially the same scale as FIGS. 2 and 5, illustrating another modification in the spacer means positioned between the inner layer and the intermediate layer in a firefighter's garment constructed in accordance with this invention. FIG. 7 may be considered as being taken substantially on line 2—2 of FIG. 1.

FIG. 8 is an exploded fragmentary perspective view, drawn on substantially the same scale as FIGS. 4 and 6, further illustrating the spacer structure shown in FIG. 7.

DETAILED DESCRIPTION OF THE INVENTION

Figure 1:
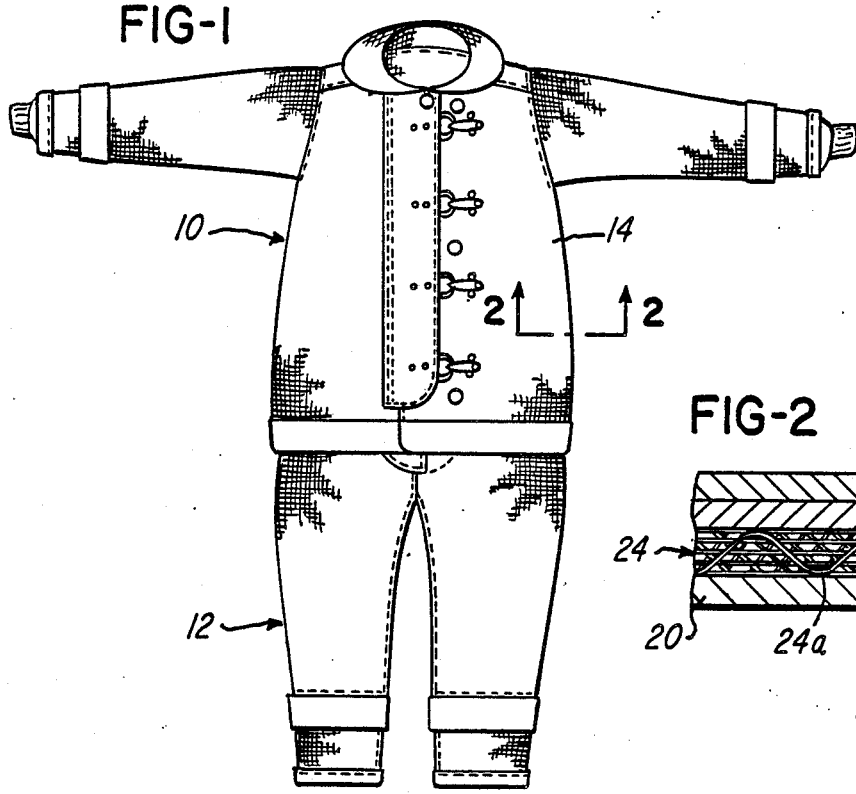
FIG. 1 is a plan view illustrating a firefighter's which include a coat and trousers.
Figure 2:
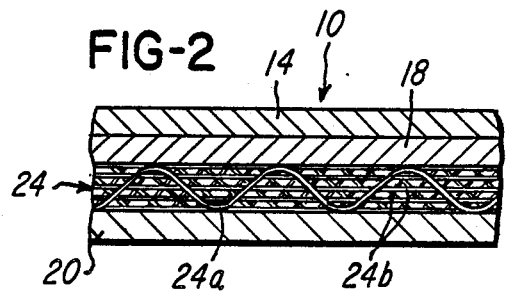
FIG. 2 is a greatly enlarged sectional view taken substantially on line 2—2 of FIG. 1.
Figure 3:
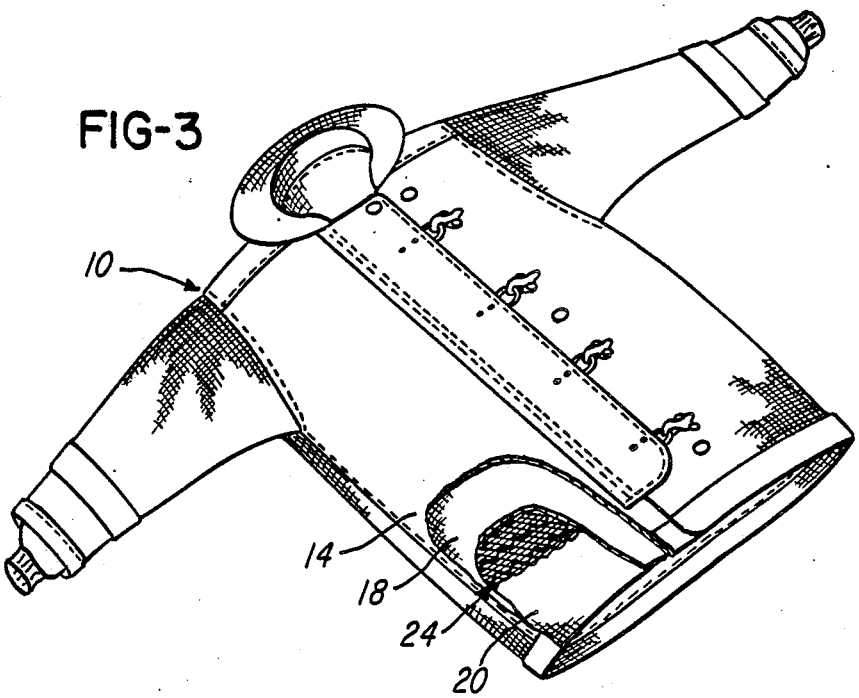
FIG. 3 is a perspective view, drawn substantially on he same scale as FIG. 1, illustrating a firefighter's coat constructed according to this invention, with parts broken away and shown in section.

FIG. 1 illustrates a firefighter's coat or jacket 10 and trousers 12 made according to this invention. The coat 10 and the trousers 12 comprise several layers of material. Preferably, the layers of material in the coat 10 and trousers 12 are substantially the same. As illustrated in FIG. 2, the coat 10 has an outer shell or outer layer 14 which is of flame resistant and abrasion resistant material. The coat 10 also has an intermediate layer 18, which is a moisture barrier. The coat 10 also has an inner layer 20, which is a thermal barrier.

In a conventional firefighter's garment the inner layer of thermal barrier is of relatively thick and bulky material. However, as shown in FIG. 2, in this invention, the inner layer or thermal barrier 20 in the coat 10 is relatively thin and flexible.

Between the inner layer 20 and the intermediate layer 18 in the coat 10 is a spacer member 24 which is in the form of a sheet or liner of a heat resistant material which provides an air space or air spaces between the inner layer 20 and the intermediate layer 18. The air space or air spaces provide excellent thermal insulation in the garment, while maintaining minimum weight in the garment. The spacer member 24 is shown as including a corrugated element 24a and a plurality of flat elements 24b. The elements 24a and 24b are attached together. The spacer member 24 is attached to the inner layer 20 and/or to the intermediate layer 18 by any suitable means, such as by stitching or the like. The spacer member 24 may be any suitable heat resistant material. The spacer member may be, for example, a Teflon material or the like. The spacer member 24 may be, for example, constructed of a material sold by Kimbre, Inc., Perrino, Florida and referred to by that company as mist eliminator material.

FIG. 4

FIG. 4 shows a portion of a firefighter's garment, such as the garment 10 or 12, constructed in accordance with this invention. The garment includes an outer shell or layer 40, an intermediate layer 42, and an inner layer 44. Between the inner layer 44 and the intermediate layer 42 is a spacer member 46, which is shown as being a sheet or liner having a plurality of interwoven corrugated spacer elements 46a and a plurality of flat spacer elements 46b. The spacer elements 46a and 46b are attached together and provide an air space or air spaces between the intermediate layer 42 and the inner layer 44. The spacer elements 46a and 46b may be of Teflon material or any other heat resistant material. The spacer member 46 is attached to the intermediate layer 42 and to the inner layer 44 by any suitable means, such as by stitching or the like. Thus, the spacer members 46 provide air spaces within the garment and thus provide excellent thermal insulation within the garment while maintaining minimum weight.

FIGS. 5 and 6

FIGS. 5 and 6 show a portion of a firefighter's garment constructed in accordance with this invention. FIG. 5 may be considered as being taken substantially on line 2—2 on FIG. 1. The garment has an outer shell or layer 50, an intermediate layer 52, and an inner layer 54. Between the inner layer 54 and the intermediate layer 52 is a plurality of spaced-apart spacer elements 56. The spacer elements 56 provide air spaces between the inner layer 54 and the intermediate layer 52 and thus provide excellent thermal insulation while maintaining minimum weight. Each of the spacer elements 56 is generally U-shaped with legs 56a stitched to the inner layer 54 and a body portion 56b stitched to the intermediate layer 52. However, the legs 56a may be attached to the intermediate layer 52 and the body portion 56b may be attached to the inner layer 54. The spacer elements 56 comprise strips of flexible heat resistant or heat insulation material.

FIGS. 7 and 8

FIGS. 7 and 8 show a portion of a firefighter's garment, such as the garment 10 or 12, which is constructed in accordance with this invention. FIG. 7 may be considered as being taken substantially on line 2—2 of FIG. 1. The garment comprises an outer layer 70, an intermediate layer 72, and an inner layer 74. Between the inner layer 74 and the intermediate layer 72 is a plurality of spaced-apart stacks 78 of strips of flexible heat resistant material. The spaces between the stacks 78 provide air space between the inner layer 74 and the intermediate layer 72, and thus excellent thermal insulation is provided while maintaining minimum weight.

SUMMARY

All of the air spacer means and elements shown and disclosed herein are capable of maintaining the same good thermal insulation qualities and characteristics in a firefighter's garment even when localized pressure or loads are applied to portions of the garment and also as localized pressure in the garment occurs as the firefighter moves and works.

A firefighter's garment constructed in accordance with this invention may be a coat or trousers or a garment of this invention may comprise a vest or other article of wearing apparel.

As illustrated in FIGS. 2, 4, 5, and 7, the corrugations 24a, 46a, and the spacer elements 56 and 78 are shown as being substantially vertical within a garment of this invention. Therefore, heated air which exists between the inner layer and the intermediate layer rises between the corrugations or spacer elements. The inner layer which is a thermal barrier is of porous material. Therefore, at the upper portion of the garment, the heated air flows outwardly from the garment through the porous material of the inner layer. Thus, a chimney effect exists within a garment of this invention, and the garment has ventilation qualities.

All or any of the spacer means shown and discussed above may extend through the entire garment, or the spacer means may be positioned only in portions of a firefighter's garment, with conventional layers of insulation material within the other portions of the garment. Thus, portions of such a garment have air space insulation, and portions of such a garment have conventional insulation.

In view of the above discussion and the drawings herein, it is understood that a firefighter's garment constructed in accordance with this invention has the same qualities of protection or better qualities of protection against the environment than conventional garments of a firefighter. However, in addition to these protective qualities, a firefighter's garment of this invention is significantly lighter in weight and less bulky than a conventional garment of a firefighter. Furthermore, a firefighter's garment of this invention has ventilation qualities to aid in constantly cooling the firefighter. Thus, a firefighter's garment of this invention enables a firefighter to work with significantly less stress than occurs in the wearing of a firefighter's conventional garment. Thus, a firefighter wearing a garment which is constructed in accordance with this invention is able to work in a more effective manner and with less danger to the health and well-being of the firefighter.

Although the preferred embodiment of the firefighter's garments of this invention has been described, it will be understood that within the purview of this invention various changes may be made in the form, details, proportion and arrangement of parts, the combination of parts, and the manner of use, which generally stated consist in firefighters' garments within the scope of the appended claims.

The invention having this been discribed, the following is claimed:

1. A firefighter's garment comprising an outer layer of flame resistant material, an intermediate layer of moisture resistant material, and an inner layer, spacer means positioned between the inner layer and the intermediate layer, the spacer means being enclosed between the inner layer and the intermediate layer whereby a dead air space is provided and circulation of air through the garment between the inner layer and the intermediate layer is prevented, the spacer means having a degree of rigidity, thereby maintaining a dead air space between the inner layer and the intermediate layer in all situations, including a situation in which localized external pressure is applied to the outer layer of the firefighter's garments, the air space thus consistently providing excellent thermal insulation while maintaining minimum weight.

2. The firefighter's garment of claim 1 in which the spacer means comprises a corrugated material.

3. The firefighter's garment of claim 1 in which the spacer means comprises a plurality of spaced-apart strips of flexible material.

4. The firefighter's garment of claim 1 in which the spacer means comprises spaced-apart stacks of flexible material.

5. The firefighter's garment of claim 1 in which the spacer means comprises spaced-apart strips of generally U-shape material.

6. The firefighter's garment of claim 1 in which the inner layer is of heat resistant material.

7. The firefighter's garment of claim 1 in which the spacer means comprises spaced-apart strips of generally U-shape material, each of the U-shape strips having leg portions which are attached to one of the layers.

8. The firefighter's garment of claim 1 in which the spacer means comprises spaced-apart strips of generally U-shape material, each of the U-shape strips having a body portion which is attached to one of the layers.

9. The firefighter's garment of claim 1 in which the spacer means comprises spaced-a-part strips of generally U-shape material, each of the U-shape strips having leg portions which are attached to one of the layers, and each of the U-shape strips having a body portion which is attached to one of the layers.

10. The firefighter's garment of claim 1 in which the spacer means comprises corrugated material and flat material.

11. The firefighter's garment of claim 1 in which the garment comprises a coat.

12. The firefighter's garment of claim 1 in which the garment comprises trousers.

13. A firefigher's garment comprising a plurality of layers of material, spacer means positioned between two of the layers of material and creating a dead air space between the two layers of material, the spacer means being enclosed between said two layers whereby circulation of air through the garment between the two layers is prevented, the spacer means comprising material having a degree of rigidity whereby the air space is maintained in all situations including situations in which localized external pressure is applied to the garment, the air space in the garment thus providing continuous and constant excellent thermal insulation qualities, and whereby the garment is light in weight.

14. The firefigher's garment of claim 13 in which the spacer means includes a corrugate element.

15. The firefighter's garment of claim 13 which includes an outer layer, an intermediate layer, and an inner layer, the spacer means being positioned between the intermediate layer and the inner layer.

16. The firefighter's garment of claim 13 in which the spacer means comprises a plurality of strips of flexible material which are attached to at least one of the layers.

17. The firefighter's garment of claim 13 in which the spacer means comprises a plurality of spaced-apart stacks of strips of flexible material.

18. The firefighter's garment of claim 13 in which the garment comprises a coat.

19. The firefighter's garment of claim 13 in which the garment comprises trousers.

20. The method of construction of a firefighter's garment comprising providing a plurality of layers of protective material, providing spacer means having a degree of rigidity, positioning the spacer means between two of the layers of material to provide dead air space between the two layers of material, enclosing the spacer-means between the two layers of material to prevent circulation of air through the garment and between the two layers of material, whereby the spacer means establishes and maintains air space between said two layers of materials even when localized external pressure is applied to the garment, the spacer means thus providing thermal insulation in the garment while permitting the garment to have minimum weight.

21. The method of claim 20 which includes positioning strips of material in spaced-apart relationship between two of the layers as spacer means between the two layers to provide an air space between the two layers.

22. The method of claim 20 which includes positioning U-shape strips of material in spaced-apart relationship between the two layers and attaching the U-shape strips of material to at least one of the layers.

* * * * *